United States Patent [19]
Howard

[11] Patent Number: 4,818,201
[45] Date of Patent: Apr. 4, 1989

[54] METHOD OF MANUFACTURING BUSHINGS WITH POWDERED METALS

[75] Inventor: Billy G. Howard, Arlington, Tex.

[73] Assignee: Martin Sprocket & Gear, Inc., Arlington, Tex.

[21] Appl. No.: 122,839

[22] Filed: Nov. 19, 1987

[51] Int. Cl.$^4$ .............................................. B22F 3/00
[52] U.S. Cl. ...................................... 425/78; 425/405.2
[58] Field of Search .......................... 425/17, 78, 405.2

[56] References Cited

U.S. PATENT DOCUMENTS

| | | | |
|---|---|---|---|
| 2,856,211 | 10/1958 | Firth | 287/52.06 |
| 3,132,379 | 5/1964 | Cvane | 425/78 |
| 3,172,153 | 3/1965 | Loomis et al. | 425/405.2 X |
| 3,571,854 | 3/1971 | Lundstrom et al. | 425/405.2 X |
| 3,648,343 | 3/1972 | Haller | 29/157.1 R |
| 3,677,583 | 7/1972 | Steinke | 287/52.06 |
| 3,775,032 | 11/1973 | Smith et al. | 425/78 |
| 3,790,374 | 2/1974 | Dedek | 75/208 R |
| 3,842,646 | 10/1974 | Kuhn | 72/354 |
| 3,982,934 | 9/1976 | Wentzell | 75/208 R |
| 4,525,094 | 6/1985 | Johnson et al. | 403/11 |

Primary Examiner—Charles Hart
Attorney, Agent, or Firm—Robert A. Felsman

[57] ABSTRACT

A die assembly having a cavity in which powdered metal is compressed with upper and lower punches. A core extends through the lower punch to form the inner wall of a bushing, and a core extension rod having a lateral protrusion that extends into the cavity to form a groove in the upper portion of the bushing. The core and the core extension rod move in concert between positions to receive powder, compress it and moves upward to afford expelling the finished bushing. One stationary protrusion extends from the die into the cavity to form a groove in the powdered metal along the full length of the completed bushing. Air passage means are used to direct air into the cavity to remove residue powder that may eventually build-up and cause inaccuracies. Also, in the preferred embodiment a powder feeder means is used on a die table to reciprocate between a retracted, inactive position and an extended position to deposit powdered metal into the cavity and later to bump a finished bushing across the table.

10 Claims, 4 Drawing Sheets

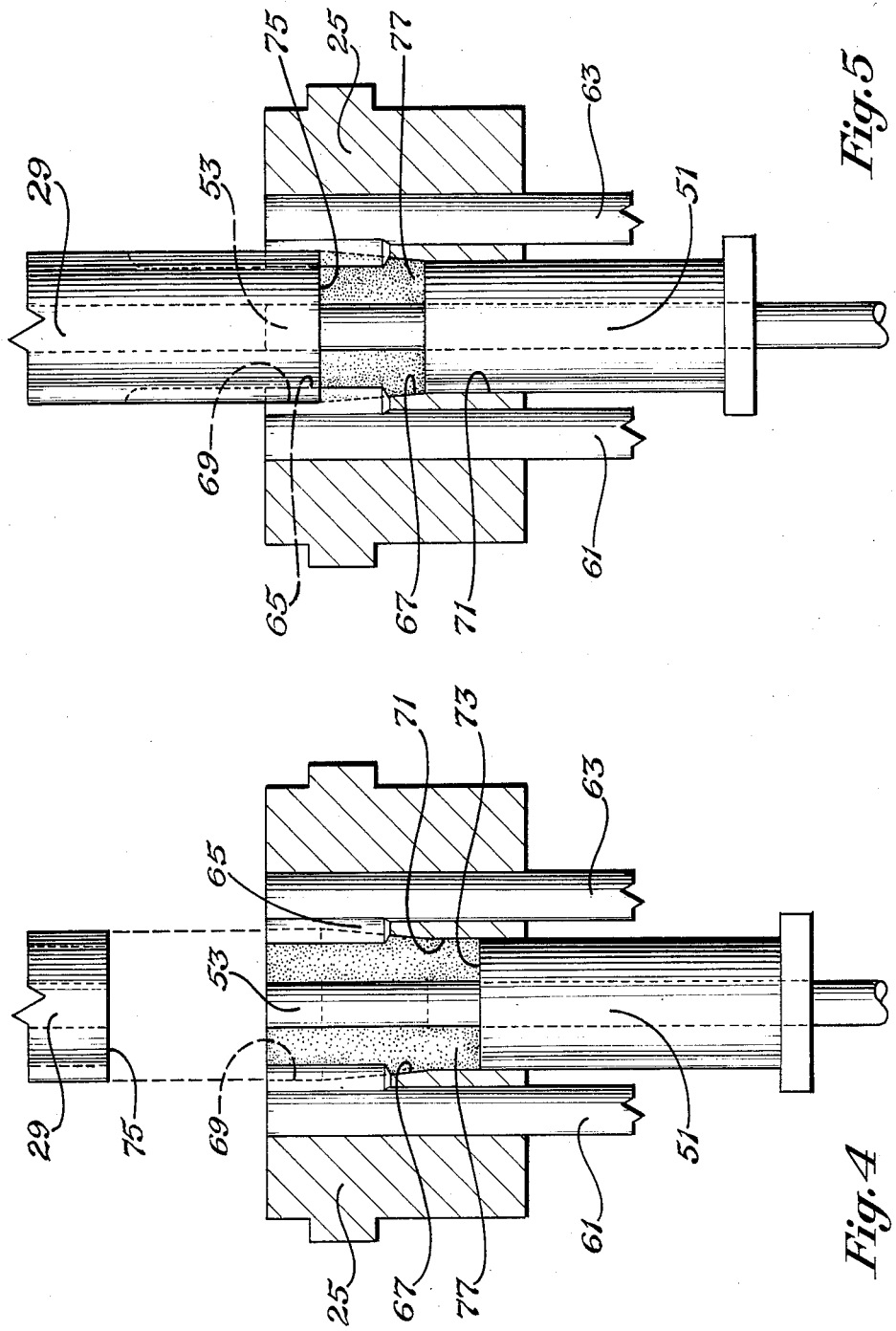

METHOD OF MANUFACTURING BUSHINGS WITH POWDERED METALS

BACKGROUND OF THE INVENTION

1. Field of the Invention

This invention relates to the manufacture of machine components with powdered metal—especially to improved methods of compressing powdered metals to form components such as bushings.

2. Background Information

The quest in manufacturing has long been the production of machine components in the most cost efficient manner that will yield high quality.

One method which is efficient for many components involves the compression of powdered metals in a die to accurate dimensions prior to sintering to the final metallurgical consistency.

One example of the many possible products of the powdered metal manufacturing technique is disclosed in U.S. Pat. No. 4,525,094, "Powdered Metal, Flanged Bushing for Securing Machine Elements to Shafts", June 25, 1985.

An earlier example of a bushing of commonly used configuration may be seen with reference to U.S. Pat. No. 3,677,583, "Bushing and Method of Manufacturing", July 18, 1972. Here, the bushings are tapered for use with hubs, each having a tapered internal wall corresponding to an external taper on an associated bushing. Screws are used in threaded holes formed between and intersecting the mating tapers to retain the bushing. This particular method of manufacture includes the steps of placing bushing blanks having the tapered surfaces together and drilling and tapping a single hole in the area of contact between them. Additional slots or grooves are formed on the periphery of each bushing blank, usually extending about one half the distance from one end of the blank to the other. These slots are also commonly formed by drilling, requiring an additional operation that adds to manufacturing costs.

SUMMARY OF THE INVENTION

The general object of the invention is to provide an improved method and apparatus for forming machine components such as bushings of powdered metal.

This object is achieved with a die assembly having a cavity in which powdered metal is compressed with upper and lower punches. A core extends through the lower punch to form the inner wall of a bushing, and a core extension rod has a lateral protrusion that extends into the cavity to form a groove in the upper portion of the bushing. The core and the core extension rod move in concert between positions to receive powder, compress it and then expel the finished bushing.

One stationary protrusion extends from the die into the cavity to form a groove in the powdered metal along the length of the completed bushing.

Air passage means are used to direct air into the cavity to remove residue powder that may eventually build-up and cause inaccuracies.

Also, in the preferred embodiment a powder feeder means is used on a die table to reciprocate between a retracted, inactive position and an extended position to deposit powdered metal into the cavity and later to bump a finished bushing across the table.

The invention also involves method steps as well as other features and advantages which will become apparent in the following description.

DESCRIPTION OF THE DRAWINGS

FIG. 4 is a fragmentary side elevational view showing the die assembly of FIG. 3 with the cavity filled with powdered metal.

FIG. 5 is a fragmentary side elevational view showing the powdered metal compressed in the cavity between the upper and lower punches.

DESCRIPTION OF THE PREFERRED EMBODIMENT

Figure 1:
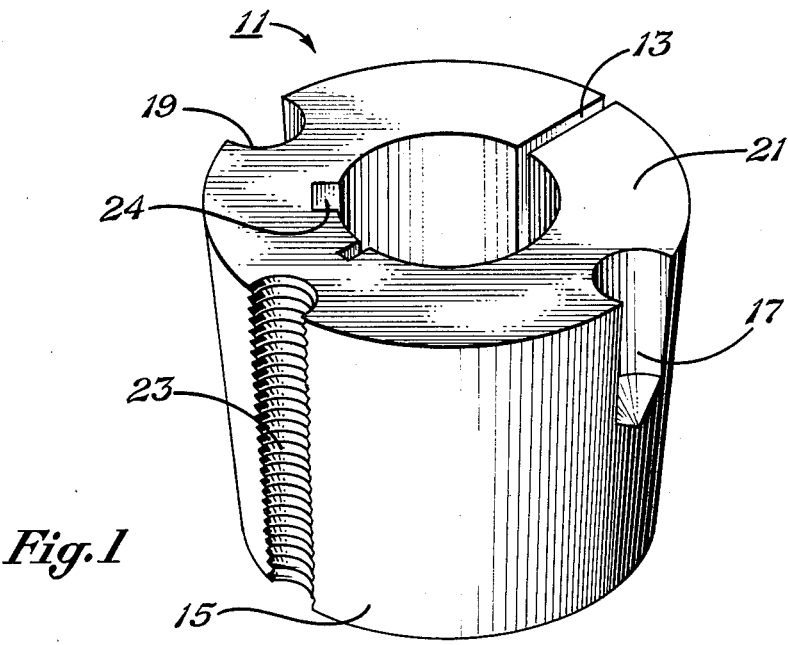
FIG. 1 is perspective view of a bushing of the type manufactured by the die assembly and method of this invention.

The numeral 11 in the drawings designates a bushing of the type shown in U. S. Pat. No. 3,677,583 which is adapted to be positioned between the hub (not shown) of a pulley, gear, sprocket or similar component and a shaft. The bushing is split at 13, has a tapered surface 15, two slots 17,19 extending about one half the distance from the top surface 21 of the bushing, and another slot 23 which extends along the entire length or thickness of the bushing, eventually to be threaded to receive a screw for detachment from the previously mentioned hub. There is also a key slot 24.

The bushing 11 is formed in a die 25 secured in a floating die table 27, above which is positioned an upper punch 29 on a hydraulically or mechanically operated upper ram 31 (not shown). A feeder box 33, filled with the selected powdered metal, is operated with a power cylinder 35 to reciprocate across the table 27 in a selective or cyclic fashion.

The floating die table 27 is supported on and actuated by a pair of front post 37,39 and rear post 41,43, each extending through a fixed press table 45. Supporting the posts is a lower ram platen 47, moved upward or downward by a lower ram 49. Consequently, movement of the lower ram 49 results in movement of the floating die table 27, downward movement of which causes a lower punch 51 to move upward relative to the die 25. Also, a core 53 extends upward from the lower ram platen 47 such that its upper end resides inside the die 25.

An adapter plate 55, movably supported by powered cylinders 57,59, is used to move upwardly or downwardly in the die relative to the core 53, a pair of core extension rods 61,63, each of which has a lateral protrusion 65 positioned laterally into the die cavity.

Figure 3:
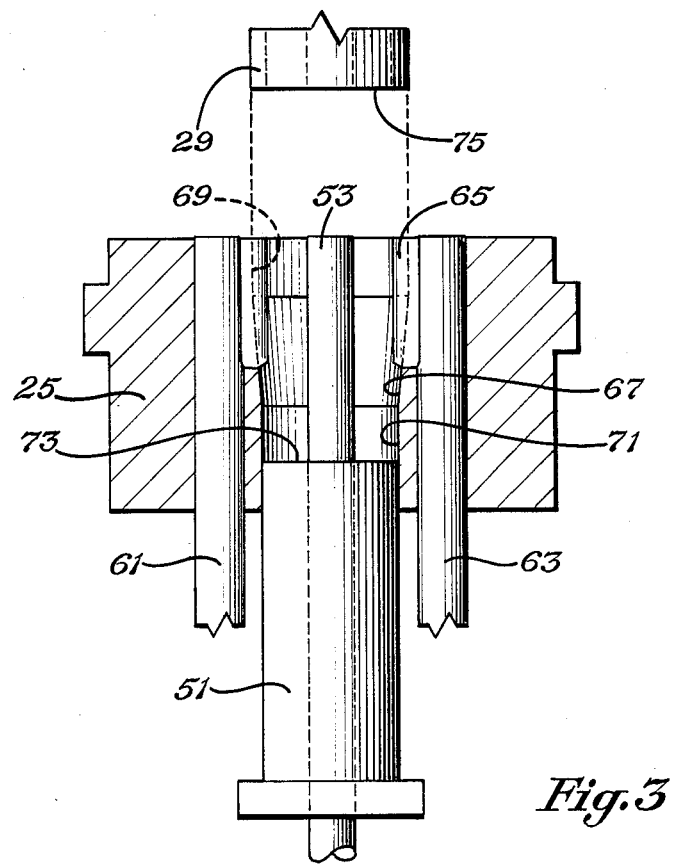
FIG. 3 is a fragmentary side elevational view showing the positions of the die assembly positioned to receive powdered metal.

The operation of the die assembly is illustrated in sequential steps in FIGS. 3 through 6. In FIG. 3 the die 25 has a tapered wall 67 intersected with upper and lower cylindrical walls 69,71. The core 53 extends through the lower punch 51 and through the die cavity to be formed by the tapered wall 67, the upper end 73 of lower punch 51 and the lower end 75 of upper punch 29. Extending into the die cavity are the lateral protrusions 65, one from each of the core extension rods 61,63.

In this condition the die cavity is empty and readied to receive powdered metal.

Figure 2:
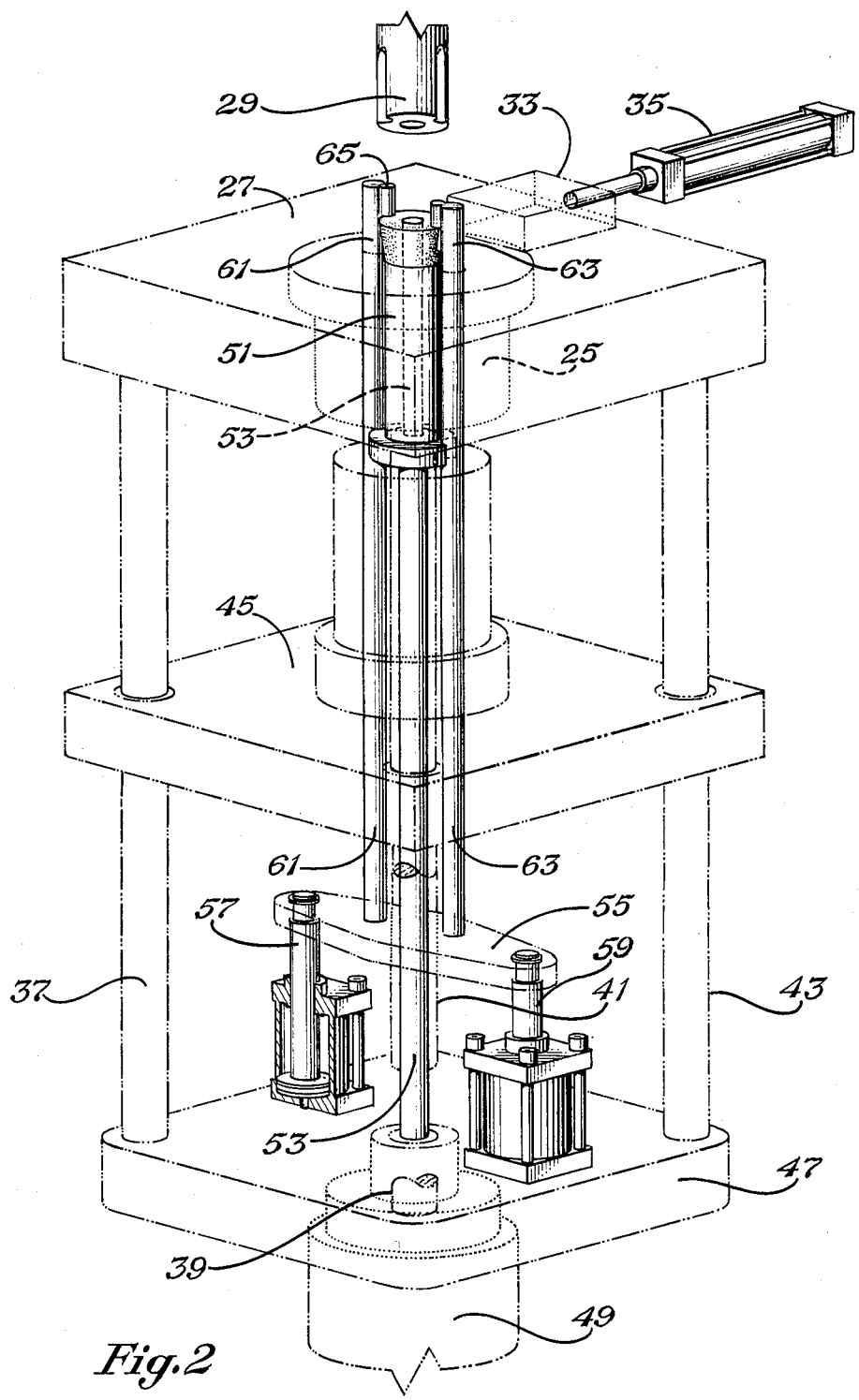
FIG. 2 is a fragmentary perspective view of a die assembly embodying the principles of the invention.

FIG. 4 shows the same components of the die assembly in the same positions, but here the powdered metal 77 has been deposited in the die cavity by the feeder box 33 (see FIG. 2). Although not apparent from the drawings, the feeder box 33 has an open bottom such that movement over the die cavity allows powdered metal to fall by gravity and fill the cavity.

The upper and lower punches 29, 51 have been actuated in FIG. 5 such that the powdered metal 77 has been uniformly compressed from the top and the bottom.

Figure 6:
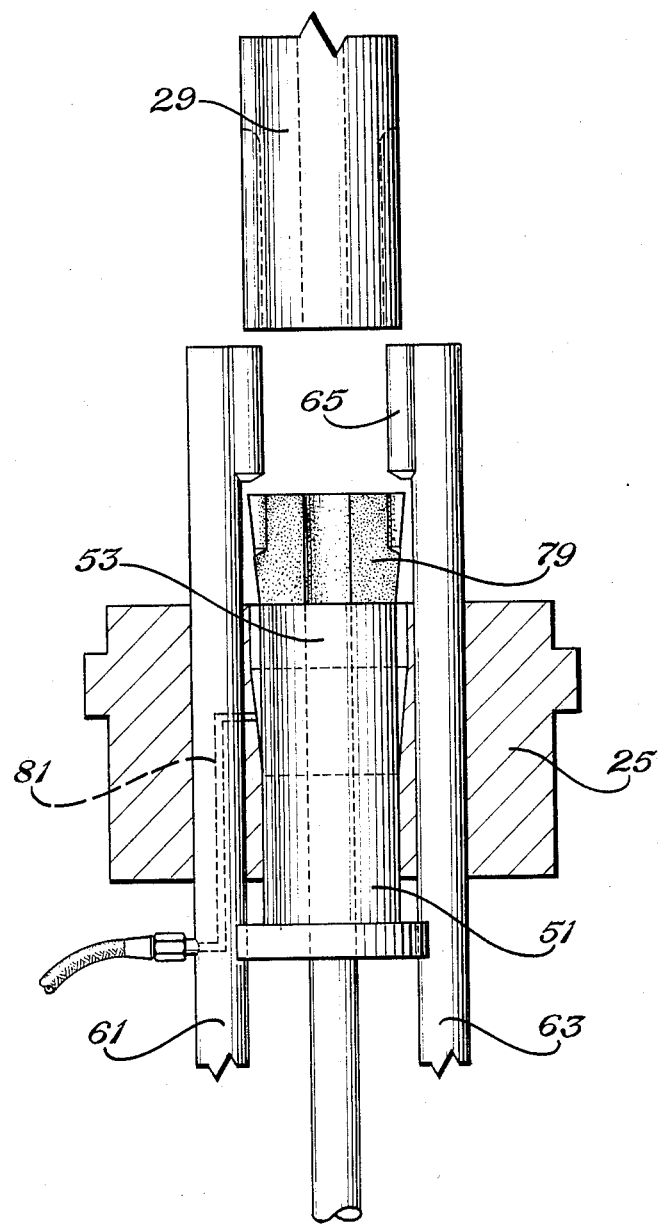
FIG. 6 is a fragmentary side elevational view of the die assembly showing positions of the components after the powder is compressed and the completed bushing ejected in preparation for another cycle.

After compression of the powdered metal 77, a completed bushing or blank 79 has been formed, as indicated in FIG. 6. The die assembly here is shown in its ejection position with the lower punch 51 extended relative to the very top of the die 25, and the core rods 61, 63 extended such that their lateral protrusions 65 are clear of the bushing 79. Now, the bushing may be removed, usually accomplished by tapping it with the end of the feeder box 33 (see FIG. 2). The components are then repositioned to the FIG. 3 condition in preparation for another cycle. As indicated by the passage 81 it is possible to introduce air into the cavity to expel residue powder that may be left after a certain number of cycles.

Although not shown in the drawings, each bushing is heated or sintered and then cooled to form the finished bushing. The split 13 is not formed in the die assembled, being formed outside the die, usually by a saw cut.

The key slot 24 is preferably formed in the die assembly by a protrusion (not shown) extending the length of the powder filled cavity. The slot 23 is threaded, as indicated in FIG. 1, often after the sintering and cooling operation.

The die assembly above utilizes a method using the steps of depositing a powdered metal with a die cavity; compressing the powdered metal between upper and lower punches; forming an inner core and outer slots with protrusions during the compression process; and ejecting the finished bushing while raising the slot forming protrusions. There are additional steps in the complete cycle such as retracting the lower punch and lowering the core extension into the die cavity; feeding powdered metal into the die cavity and selectively injecting air into the cavity.

It should be apparent that an invention of significant advantages has been provided. A greater percentage of the bushing is produced in the die assembly without need for additional operations. Specifically, the grooves 17, 19 that extend only partially through the length of the bushing 11 of FIG. 1 are formed in the die without need for machining. This is accomplished by the use of the core extension rods 61, 63 and the lateral protrusions 65, which are freed of the finished bushing 79 when ejected from the cavity.

While the invention has been shown in only one of its forms, it should be apparent to those skilled in the art that it is not thus limited, but is susceptible to various changes and modifications without departing from the spirit thereof.

I claim:

1. A die assembly for forming with powdered metal selected machine components such as bushings for shafts, the assembly comprising:
   a die including a cavity for receiving powdered metal and forming a hollow metal bushing of a selected inner wall dimension and a tapered and grooved outer wall configuration;
   a lower punch to form the lower end of the cavity;
   an upper punch to extend and retract into the opposite end of the die to form the upper end of the cavity;
   a core extending through the lower punch, into the cavity and into a lower region of the upper punch during powdered metal compression to form the inner wall of the bushing;
   feeder means to deposit powdered metal in the cavity when the upper punch is retracted;
   core extension rods extending through the die, generally parallel with the core, with lateral protrusions extending into the cavity to form grooves on the exterior of the bushing;
   means moving the core extension rods in concert with the core between a powder compression position and a position to expel the finished bushing.

2. The invention defined by claim 1 which further comprises:
   at least one stationary protrusion extending from the die into the cavity to form a groove in the powdered metal along the length of the completed bushing.

3. The invention defined by claim 1 which further comprises:
   air passage means extending through the die and into the cavity; and
   control means to selectively discharge air through the air cavity to expel residue powder.

4. The die assembly defined by claim 1 which further comprises:
   a die table in which the die is mounted with its upper surface flush with the upper surface of the table;
   a powder feeder box used as the feeder means, reciprocable on the table top between a retracted, inactive position and an extended position to bump a finished bushing across the table and to deposit powdered metal in the cavity.

5. The assembly defined by claim 4 which further comprises:
   a floating die table to which the die is immovably secured, the table being moved relative to the lower punch such that it assumes in the die a powder receiving position, a powder compression position and a bushing ejection position.

6. A die assembly for forming with powdered metal selected machine components such as bushings for shafts, the assembly comprising:
   a die including a cavity for receiving powdered metal and forming a hollow metal bushing of a selected inner wall dimension and a tapered and grooved outer wall configuration;
   a lower punch powered for reciprocal movement to extend through one end of the die to form the lower end of the cavity, to assist in the compression of the powdered metal and to eject the bushing when completed;
   an upper punch powered for reciprocal movement to extend and retract into the opposite end of the die to selectively form the upper end of the cavity and to assist in the compression of the powdered metal;
   a core extending through the lower punch, into the cavity and into a lower region of the upper punch during powdered metal compression to form the inner wall of the bushing;

feeder means to deposit powdered metal in the cavity when the upper punch is retracted;

core extension rods extending through the die generally parallel with the core, with lateral protrusions extending into the cavity to form grooves on the exterior of the bushing;

means moving the core extension rods in concert with the core between powder compression position and a position to expel the finished bushing.

7. The invention defined by claim 6 which further comprises:

at least one stationary protrusion extending from the die into the cavity to form a full length groove in the powdered metal and completed bushing.

8. The invention defined by claim 6 which further comprises:

air passage means extending through the die and into the cavity; and control means to selectively discharge high pressure air through the air cavity to expel residue powder.

9. The die assembly defined by claim 6 which further comprises:

a die table in which the die is mounted with its upper surface flush with the upper surface of the table;

a powder feeder box used as the feeder means, reciprocable on the table top between a retracted, inactive position and an extended position to bump a finished bushing across the table and to deposit powdered metal in the cavity.

10. The assembly defined by claim 7 which further comprises:

a floating die table to which the die is immovably secured, the table being moved relative to the lower punch such that it assumes in the die a powder receiving position, a powder compression position and a bushing ejection position.

* * * * *